No. 834,332. PATENTED OCT. 30, 1906.
L. Q. SPAULDING.
CULTIVATOR.
APPLICATION FILED AUG. 28, 1905.

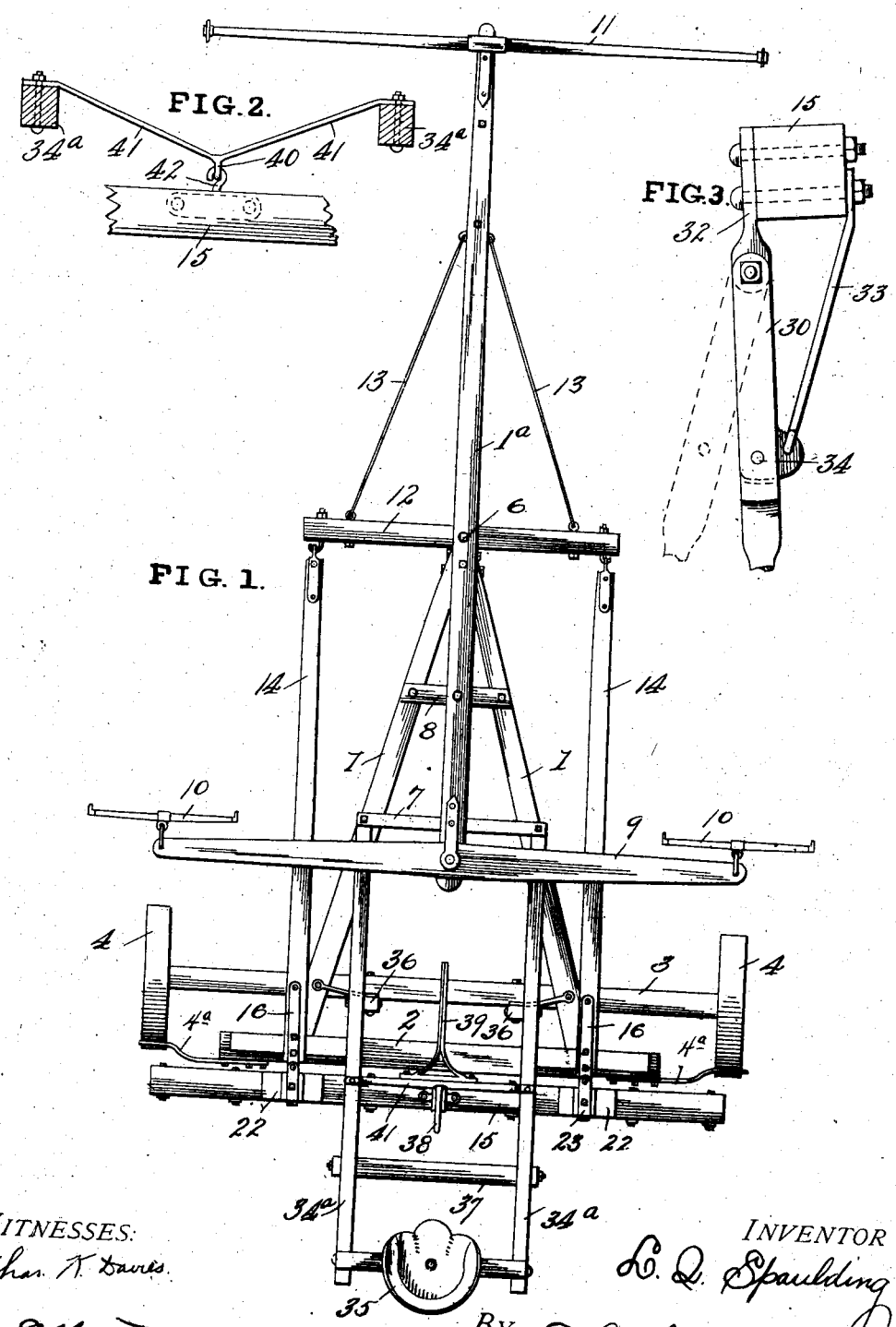

2 SHEETS—SHEET 2.

WITNESSES:
Chas. N. Davies.

INVENTOR
L. Q. Spaulding
BY Shepherd & Parker
Attorneys

THE NORRIS PETERS CO., WASHINGTON, D. C.

UNITED STATES PATENT OFFICE.

LLEWELLYN Q. SPAULDING, OF IDAGROVE, IOWA.

CULTIVATOR.

No. 834,332.
Specification of Letters Patent.
Patented Oct. 30, 1906.

Application filed August 28, 1905. Serial No. 276,024.

*To all whom it may concern:*

Be it known that I, LLEWELLYN Q. SPAULDING, a citizen of the United States, residing at Idagrove, in the county of Ida and State of Iowa, have invented certain new and useful Improvements in Cultivators, of which the following is a specification.

This invention relates to cultivators and to that particular class adapted for use in con nection with grains and plants, the seeds of which are sown in rows by a drill.

The object of this invention is to provide a cultivator having shovels or disks adapted to be moved laterally by the operator while the machine is in motion and traversing lines a fixed distance apart and always pointing forward in the line of draft.

It is a further object of my invention to provide a cultivator in which the draft of the shovels is as far forward of the wheels as possible and in which the shovels are permitted to have a slight temporary variation in direction from the tongue and wheels.

It is a further object of this invention to provide a cultivator adapted to accomplish the cultivation of drill-sown seed in a thorough and practical manner.

Figure 4:
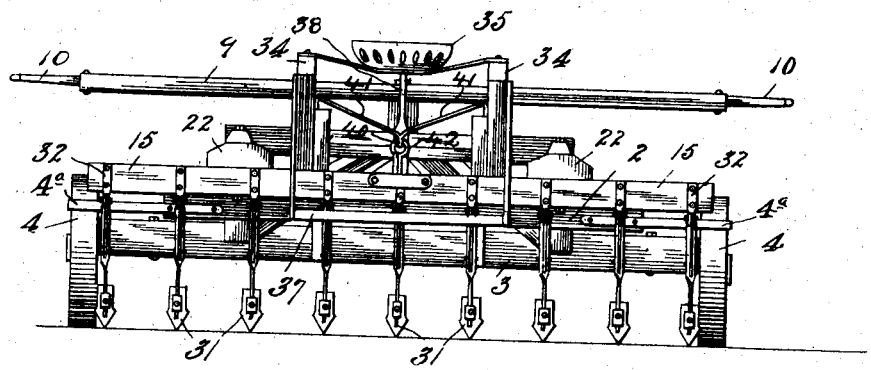
Figure 5:
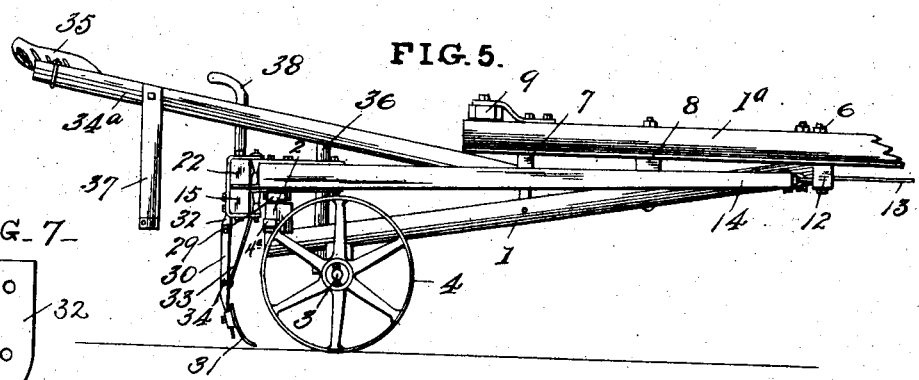
Figure 7:
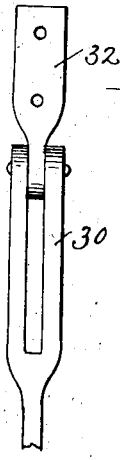
Figure 6:
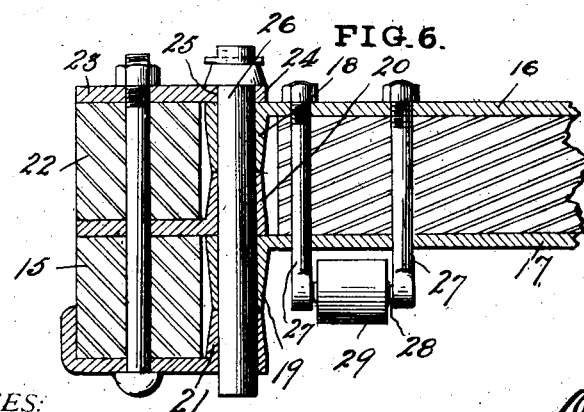

In the drawings, Figure 1 is a top plan view of my machine. Fig. 2 is an enlarged detail view of means adapted to hold the shovels out of engagement with the ground. Fig. 3 is a similar view showing the construction of a shovel-shank and the manner in which the same is secured to the shovel-bar.
Fig. 4 is a rear elevation of the cultivator. Fig. 5 is a side elevation of the same. Fig. 6 is an enlarged detail view of the hinge connection between the shovel-bar and one of the draw-bars. Fig. 7 is a rear view of the shovel-shank and hanger.

Referring to the drawings, in which like numerals of reference designate corresponding parts, 1 represents the side pieces of the main frame of the cultivator, which are bolted at their forward ends to the tongue 1ª, their rear ends being connected by member 2 of said frame. This main frame is supported by axle 3, provided with wheels 4. Tongue 1ª is bolted at 6 to the forward part of the frame, the rear part of said tongue being secured to side pieces 1 by yoke 7 and brace 8. A doubletree 9, provided with swingletrees 10, is pivoted to the rear end of said tongue, while at its forward end a neck-yoke 11 is provided. Secured to the tongue 1ª at the forward end of the frame is a horizontal cross-piece 12, strengthened by guy-rods 13. Cross-piece 12 has pivoted at its outer ends draw-bar 14, to the rear ends of which is hinged shovel-bar 15.

As shown in Fig. 6, the hinge connection between draw-bar 14 and shovel-bar 15 is made by providing said draw-bar with straps 16 and 17, provided with downwardly-extending sleeves 18 and 19, adapted to register with upwardly-extending sleeves 20 and 21, secured in a similar manner to the shovel-bar, said shovel-bar being provided with blocks 22, bolted thereto, said blocks carrying straps 23 with extensions 24, provided with apertures 25, adapted to register with the passages through said sleeves. The hinge-bolt 26, passing through these registering apertures, forms a hinge connection between said draw-bars and shovel-bar especially adapted to withstand the strain put upon it. The bolts 27, which secure straps 16 and 17 to the draw-bar, are provided with bearings 28 for roller 29, said roller being adapted to rest upon the member 2 of the main frame for the purpose of supporting said draw-bars and shovel-bar and to prevent friction between the draw-bars and member 2 of the main frame when the shovel-bar is moved laterally.

The shovel-shank 30, carrying an adjustable shovel 31, has a bifurcated upper portion the members of which span and are pivoted at their upper ends to hanger 32. This hanger is provided with an ear near its lower end, to which is secured a stay-rod 33. A wooden break-pin 34 passes through the forked members of shank 30 and the lower end of hanger 32 and serves to hold the shovels in position under normal conditions; but excessive strain will break the pin 34 and allow the shank to swing back on its pivot, thereby preventing damage to the cultivator.

34ª represents supports for an operator's seat 35, said supports being secured to the axle 3 by vertical pieces 36 and to the yoke 7, which supports the rear end of the tongue. The foot-rest 37 is also secured to the supports 34ª. In order that the shovel-bar 15 may be readily controlled by the operator and the position of the shovels known, a handle 38 and indicator 39 are secured to the center of said bar.

4ª represents wheel-scrapers of any desired construction secured to member 2.

Referring to Fig. 2, hook 40, secured to supports 34ª by straps 41, is adapted to receive hook 42, carried by shovel-bar 15 when it is desired to hold the shovels out of engagement with the ground.

The operation of my machine is as follows: Horses being attached between the swingletrees 10 and neck-yoke 11 and the shovel-bar 15 being supported on hook 40, the cultivator may be moved to the place of operation without the shovels 31 coming into engagement with the ground. When it is desired to put the machine into operation, the handle 38 is grasped and the shovel-bar 15 disengaged from hook 40 and lowered to the ground. This allows the rollers 29, carried by the rear ends of draw-bars 14, to rest on member 2 of the main frame. While the machine is in motion the operator is enabled, by placing his feet against blocks 22, to move the shovels 31 to the right or left, as desired, the indicator 39 showing the direction of the shovels at all times. The resistance of the shovels acting on the tongue forward of the doubletree prevents the lash of the tongue due to the unevenness of the ground.

While I have shown and described my invention in connection with a cultivator provided with shovels of the ordinary type, it is to be understood that disks or other devices may be substituted without departing from the spirit of my invention.

Having thus described my invention, what I claim as novel, and desire to secure by Letters Patent, is—

1. In a cultivator, a wheeled frame, a shovel-bar supported therefrom, shovel-hangers depending from said bar, shovels suspended from said hangers, said shovels being severally provided with a bifurcated shank, inclosing said hangers and having pivoted connection at their upper ends with said hangers, and frangible connections engaging said shank and said hangers below the pivotal connection of said last-named elements and coacting with said pivotal connection to maintain said shovels normally rigid.

2. In a cultivator, the combination with a wheeled frame of a shovel-bar movably supported from said frame, and a horizontal indicating-pointer carried by said shovel-bar and overlying a relatively stationary portion of the frame.

3. In a cultivator, the combination of a frame carried upon a wheel-supported axle, a cross-piece in front of said axle, a shovel-bar carrying a plurality of shovels in rear of said axle and draw-bars connecting said shovel-bar to said cross-piece.

4. In a cultivator, the combination with a frame of a hanger carried by said frame, a shovel-shank having a bifurcated upper portion pivoted to and adapted to receive the lower portion of said hanger, and a break-pin adapted to normally hold said shovel-shank against rearward movement.

5. In a cultivator, the combination with a wheel-supported frame, of a movable bar, disposed rearwardly of the wheels of said frame, draw-bars having pivotal connection at their rear ends with said shovel-bar and at their forward ends, forwardly of said wheels with said frame, a transverse bar carried by said frame, adapted to support said draw-bars, and upon which said draw-bars have movement with relation to their pivots, and antifriction-rollers carried by said draw-bars, and bearing against said transverse bar.

6. In a cultivator the combination with a wheel-supported frame, of a horizontal cross-piece secured forwardly of the wheels of said frame, rearwardly-extending draw-bars having loose pivotal connection at their forward ends with said cross-piece, a shovel-bar having direct pivotal connection with the rear ends of said draw-bars and means for loosely supporting said draw-bars.

In testimony whereof I affix my signature in presence of two witnesses.

LLEWELLYN Q. SPAULDING.

Witnesses:
W. R. ABELL,
B. F. HOWELL.